United States Patent
Leone et al.

(10) Patent No.: US 10,328,772 B2
(45) Date of Patent: Jun. 25, 2019

(54) SYSTEM AND METHODS FOR EXTRACTING WATER FROM AN ELECTRIC AIR CONDITIONING SYSTEM FOR WATER INJECTION

(71) Applicant: Ford Global Technologies, LLC, Dearborn, MI (US)

(72) Inventors: Thomas G. Leone, Ypsilanti, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 15/271,954

(22) Filed: Sep. 21, 2016

(65) Prior Publication Data
US 2018/0079280 A1 Mar. 22, 2018

(51) Int. Cl.
*B60L 58/12* (2019.01)
*B60H 1/32* (2006.01)
(Continued)

(52) U.S. Cl.
CPC ............ *B60H 1/3233* (2013.01); *B60H 1/004* (2013.01); *B60H 1/00271* (2013.01); *B60H 1/00385* (2013.01); *B60L 1/003* (2013.01); *B60L 7/26* (2013.01); *B60L 15/2009* (2013.01); *B60L 50/15* (2019.02); *B60L 58/12* (2019.02); *F02M 25/028* (2013.01); *F02M 25/03* (2013.01); *B60H 2001/3266* (2013.01); *B60H 2001/3273* (2013.01); *B60H 2001/3275* (2013.01);
(Continued)

(58) Field of Classification Search
CPC ............. B60H 1/3233; B60H 1/00385; B60H 2001/3266; B60H 2001/3273; B60L 1/003; B60L 7/26; F02M 25/028; F02M 25/03; B60Y 2400/81; B60Y 2300/51; Y10S 903/903
USPC .................................... 701/22, 70; 180/65.21
See application file for complete search history.

(56) References Cited

U.S. PATENT DOCUMENTS 6,026,641 A 2/2000 Liberty
6,989,644 B2 1/2006 Kim
(Continued)

FOREIGN PATENT DOCUMENTS

EP 2607647 A1 6/2013

OTHER PUBLICATIONS

Leone, Thomas G., et al., "Method and System for Controlling Water Injection," U.S. Appl. No. 15/216,497, filed Jul. 21, 2016, 47 pages.
(Continued)

*Primary Examiner* — Gertrude Arthur Jeanglaude
(74) *Attorney, Agent, or Firm* — Julia Voutyras; McCoy Russell LLP

(57) ABSTRACT

Methods and systems are provided for adjusting a ratio of friction to regenerative brake effort and running an electric air conditioning compressor to collect condensed water for water injection into an engine. In one example, a method may include adjusting the air conditioning compressor load of the electric AC system and the ratio of friction to regenerative brake effort based on a water level in a water storage tank of the water injection system. Further, the method may include directing energy from regenerative braking to a battery and/or to the AC compressor in response to the battery state of charge.

18 Claims, 6 Drawing Sheets

(51) Int. Cl.
  *B60H 1/00* (2006.01)
  *B60L 1/00* (2006.01)
  *B60L 7/26* (2006.01)
  *F02M 25/028* (2006.01)
  *F02M 25/03* (2006.01)
  *B60L 15/20* (2006.01)
  *B60L 50/15* (2019.01)

(52) U.S. Cl.
  CPC ..... *B60L 2240/545* (2013.01); *B60Y 2300/51* (2013.01); *B60Y 2400/81* (2013.01); *Y02T 10/121* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01); *Y10S 903/903* (2013.01)

(56) References Cited

U.S. PATENT DOCUMENTS

| | | |
|---|---|---|
| 7,552,705 B2 | 6/2009 | Serkh et al. |
| 7,748,481 B2 | 7/2010 | Holmes et al. |
| 9,291,125 B2 | 3/2016 | Yoshihara et al. |
| 2010/0121559 A1 | 5/2010 | Bromberg et al. |
| 2011/0048039 A1 | 3/2011 | Kohavi et al. |
| 2011/0168463 A1* | 7/2011 | Perkins ............... B60H 3/0071 180/65.21 |
| 2011/0174267 A1 | 7/2011 | Surnilla et al. |
| 2013/0218438 A1 | 8/2013 | Surnilla et al. |
| 2013/0291580 A1 | 11/2013 | Lindner |
| 2014/0366508 A1 | 12/2014 | Ulrey et al. |
| 2015/0202964 A1* | 7/2015 | Nefcy ............... B60L 7/18 701/70 |

OTHER PUBLICATIONS

Leone, Thomas G., et al., "Method and System for Controlling Water Injection," U.S. Appl. No. 15/216,525, filed Jul. 21, 2016, 63 pages.

Leone, Thomas G., et al., "Method and System for Controlling Water Injection," U.S. Appl. No. 15/285,311, filed Oct. 4, 2016, 54 pages.

Leone, Thomas G., et al., "System and Methods for Extracting Water from a Mechanical Air Conditioning System for Water Injection," U.S. Appl. No. 15/272,017, filed Sep. 21, 2016, 44 pages.

Leone, Thomas G., et al., "System and Methods for Extracting Water from a HVAC System for Water Injection," U.S. Appl. No. 15/272,111, filed Sep. 21, 2016, 50 pages.

Bohm, Martin, et al., "Approaches for On-board Water Provision for Water Injection," ATZ Worldwide 2016, vol. 118, pp. 54-57, 4 pages.

* cited by examiner

SYSTEM AND METHODS FOR EXTRACTING WATER FROM AN ELECTRIC AIR CONDITIONING SYSTEM FOR WATER INJECTION

FIELD

The present description relates generally to methods and systems for an electric air conditioning system and a water injection system of an engine.

BACKGROUND/SUMMARY

Internal combustion engines may include water injection systems that inject water from a storage tank into a plurality of locations, including an intake manifold, upstream of engine cylinders, or directly into engine cylinders. Injecting water into the engine intake air may increase fuel economy and engine performance, as well as decrease engine emissions. When water is injected into the engine intake or cylinders, heat is transferred from the intake air and/or engine components to the water. This heat transfer leads to evaporation, which results in cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, and decreased exhaust temperature. As a result, fuel efficiency is increased. Additionally, greater volumetric efficiency may lead to increased torque. Furthermore, lowered combustion temperature with water injection may reduce NOx, while a more efficient fuel mixture may reduce carbon monoxide and hydrocarbon emissions. As mentioned above, water may be stored in a vehicle to provide water for injection on demand. However, in order to meet the water injection demands of an engine, a vehicle needs to have a sufficient supply of water. In one example, a water storage tank of a water injection may be manually refilled by a vehicle operator. However, in some situations, water for refilling the tank may not be readily available and having to re-fill the tank may be undesirable for the operator.

Other approaches to refilling a water storage tank includes collecting water (or condensate) from other vehicle systems on-board the vehicle, such as collecting water from an air conditioning (AC) system. For example, the approach shown by Kohavi and Peretz in US 20110048039 includes extracting water from an air conditioning system. Therein, collecting condensate is based on an amount of water stored in a water storage reservoir (e.g. tank). However, the inventors have recognized potential issues with such methods. In particular, collecting water opportunistically from an AC system when the AC system is already operating may be insufficient to meet the water injection demands of an engine. Additionally, if an AC compressor of the AC system is operated using energy stored at a battery (e.g. an electric AC system), as may be the case in a hybrid electric vehicle, the battery may not have enough stored electrical energy to operate the AC system when water is needed. Further, if excess electrical energy is available, the AC compressor may be operated to maximize water collection under conditions with a reduced fuel economy penalty.

In one example, the issues described above may be addressed by a method for a hybrid vehicle including adjusting an AC compressor loading of an electric AC system and a ratio of friction to regenerative brake torque during braking based on a level of water in a water reservoir coupled to a water injection system. A water injection system, including the water reservoir, may be fluidically coupled to the electric AC system. Thus, when the AC compressor is run (e.g., as the AC compressor load increase), water may be collected from the electric AC system and stored at the water reservoir for use in the water injection system. During a braking event, a portion of the electrical power generated during the braking event may be used to operate the AC compressor based on the water level in a water reservoir. In this way, the AC compressor may be operated during a braking event to collect water for a water injection system, thereby providing water for injection via the water injection system. For example, adjusting the AC compressor load and the ratio of friction to regenerative braking may include decreasing the ratio of friction to regenerative braking and running the AC compressor from energy generated from the regenerative braking system to increase the AC compressor load in response to the water level in the water reservoir (e.g. tank) being less than a threshold level. When a battery of the hybrid vehicle is not able to store charge, all energy recovered from regenerative braking may be directed to run the AC compressor. However, when water collection for the water injection system is needed and the battery is able to store energy, energy recovered from regenerative braking may be directed to both the AC compressor and battery, thereby providing energy for the AC compressor and battery in response to demand. In this way, energy recovered from the regenerative braking system may be used to run the AC compressor and collect water for the water injection system. As a result, the water reservoir of the water injection system may be replenished automatically without manual filling and without draining the battery of the hybrid vehicle. Further, the AC compressor may be run and water for injection collected, even when the battery cannot accept charge from the regenerative braking system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
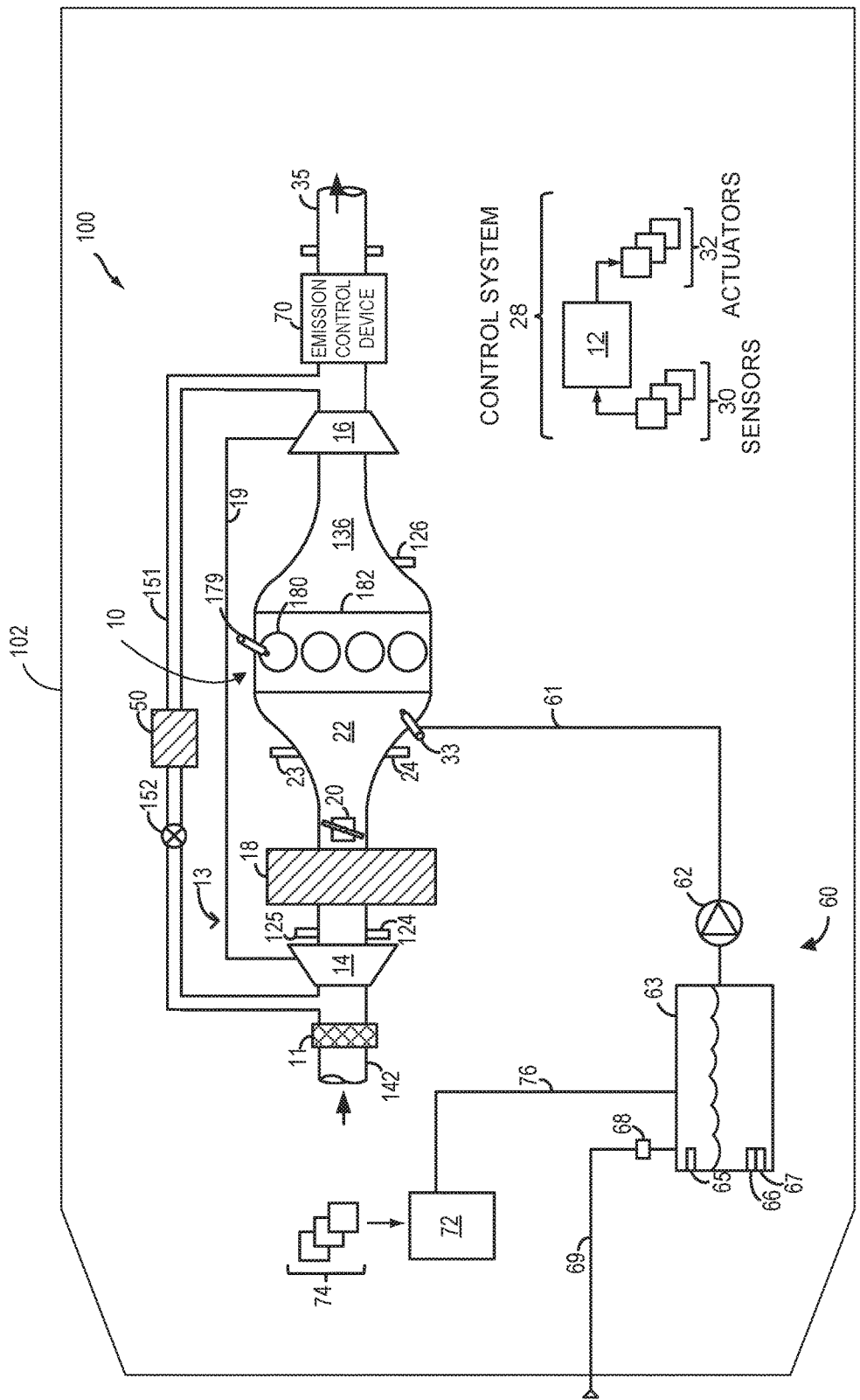
FIG. 1 shows a schematic diagram of an engine system including a water injection system.
Figure 2:
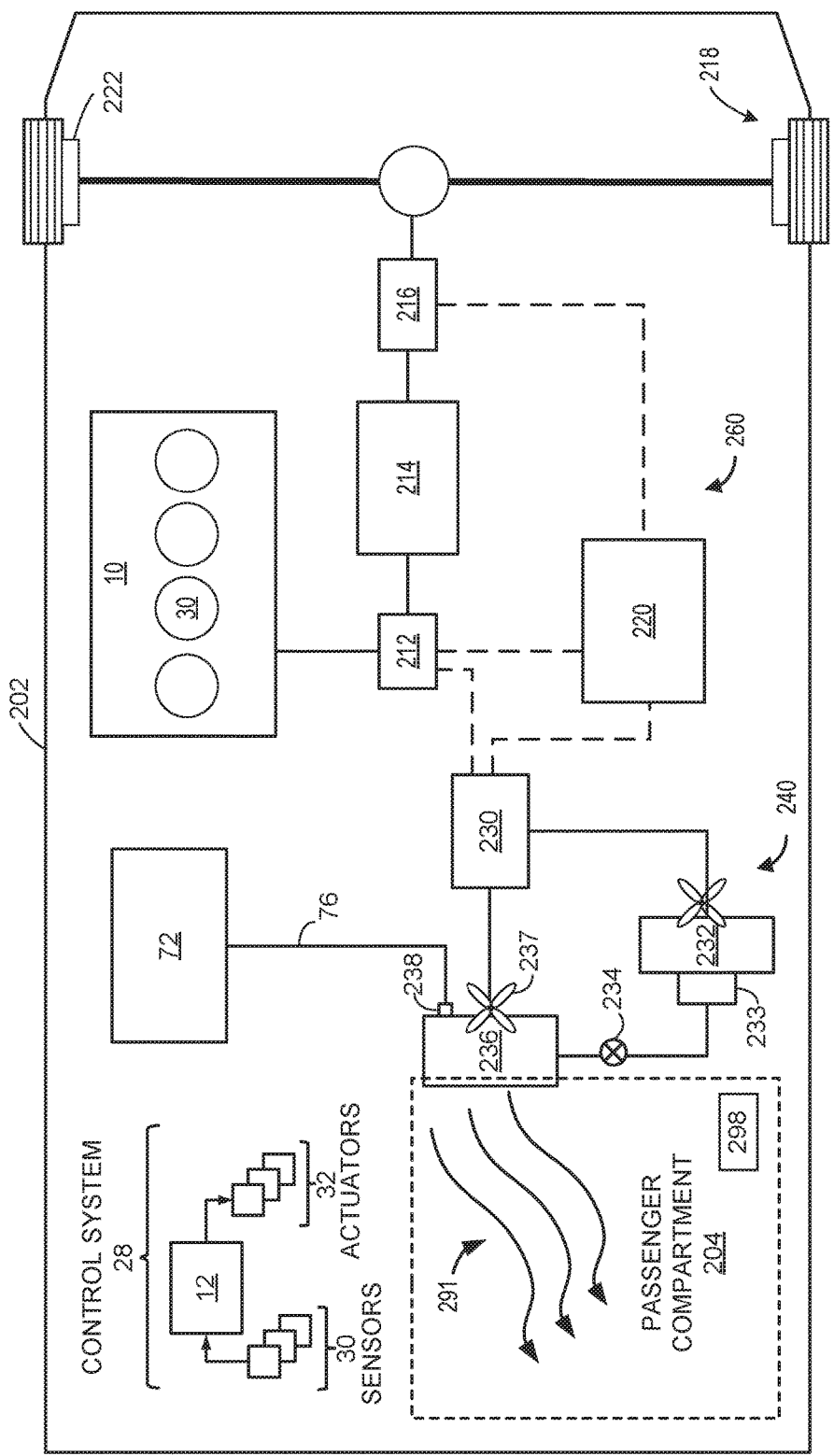
FIG. 2 shows a schematic diagram of a hybrid electric vehicle system including a water injection system, an air conditioning system, and a regenerative braking system.
Figure 3:
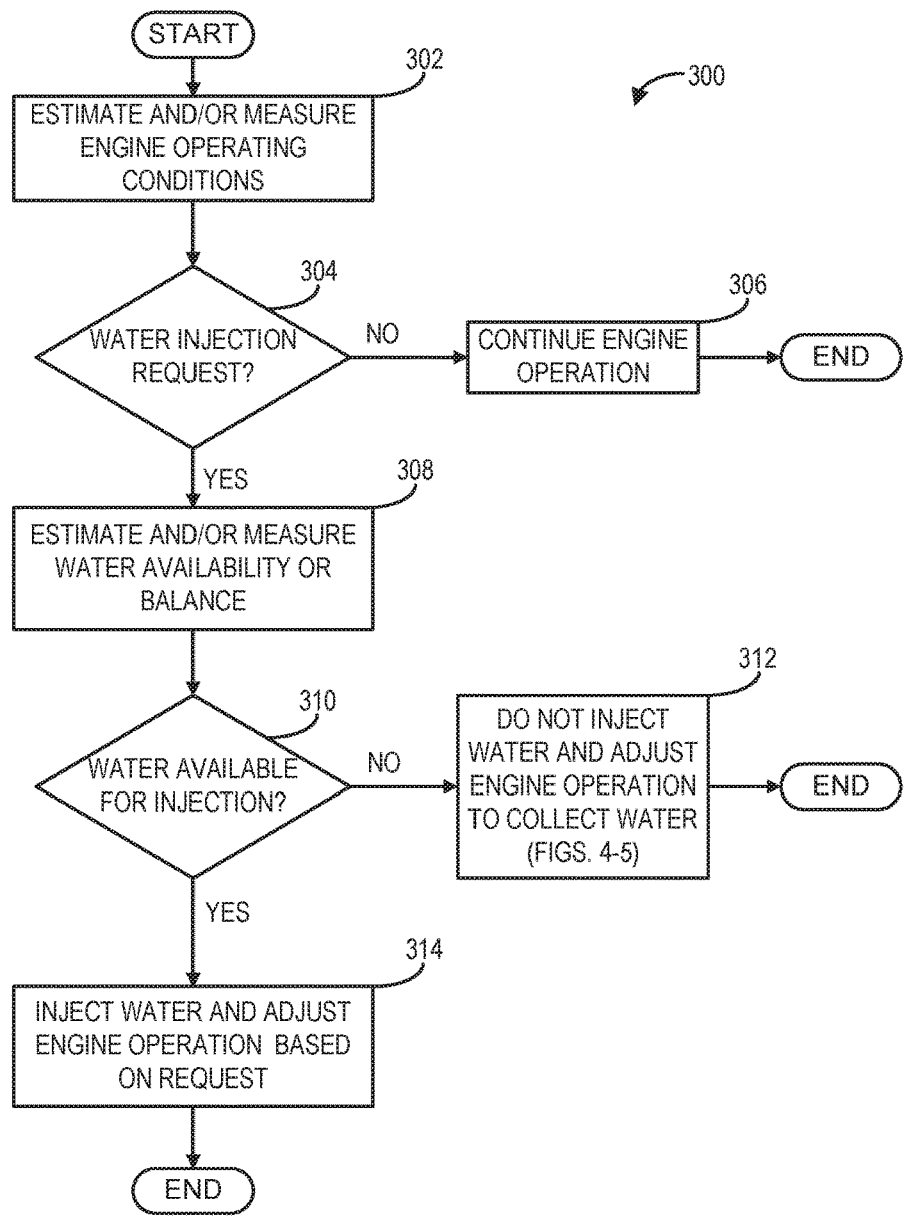
FIG. 3 shows a flow chart of a method for injecting water into an engine based on an injection request.
Figure 4:
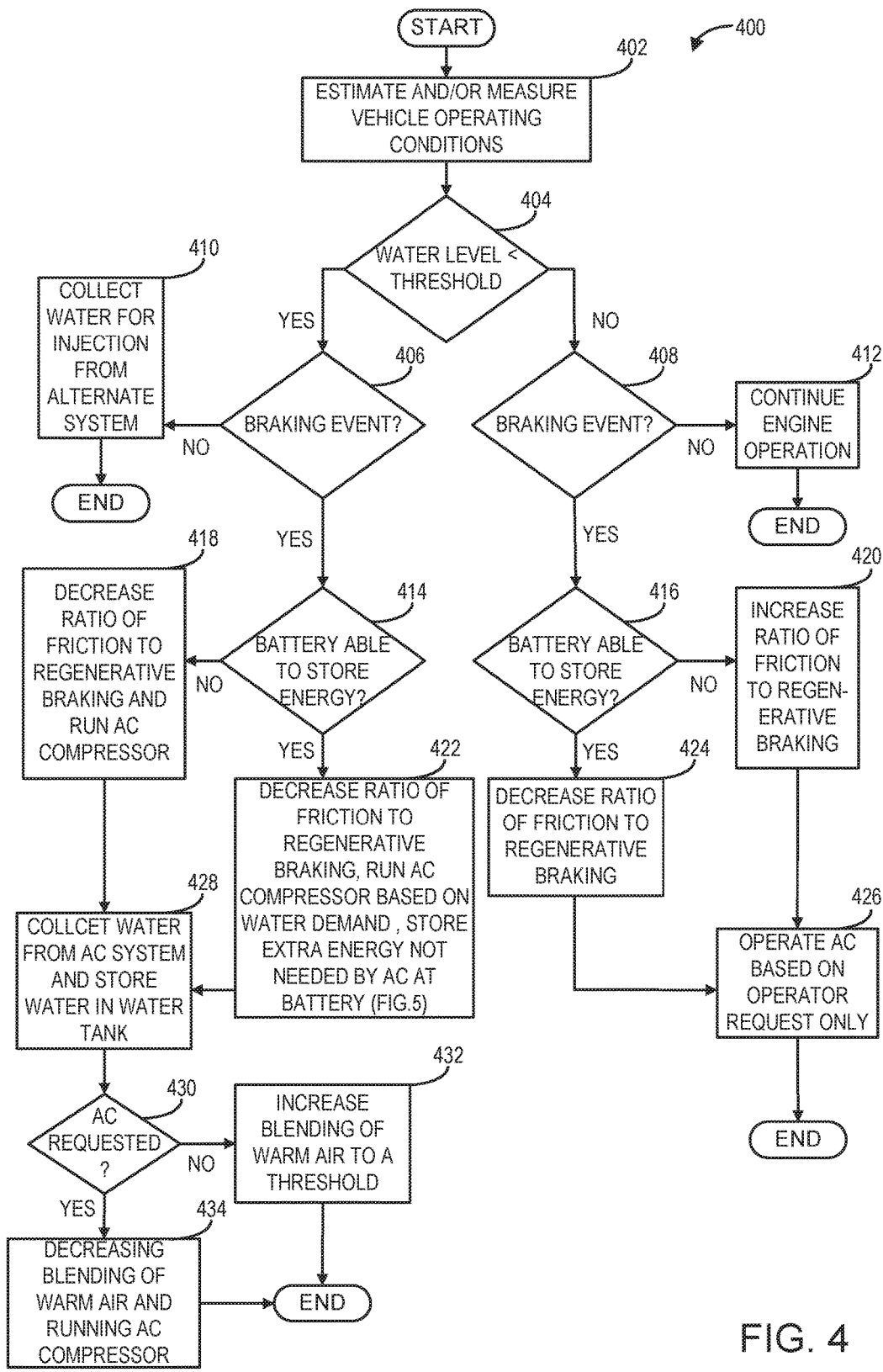
FIG. 4 shows a flow chart of a method for collecting condensate from an air conditioning system and storing extracted condensate for water injection at an engine.
Figure 5:
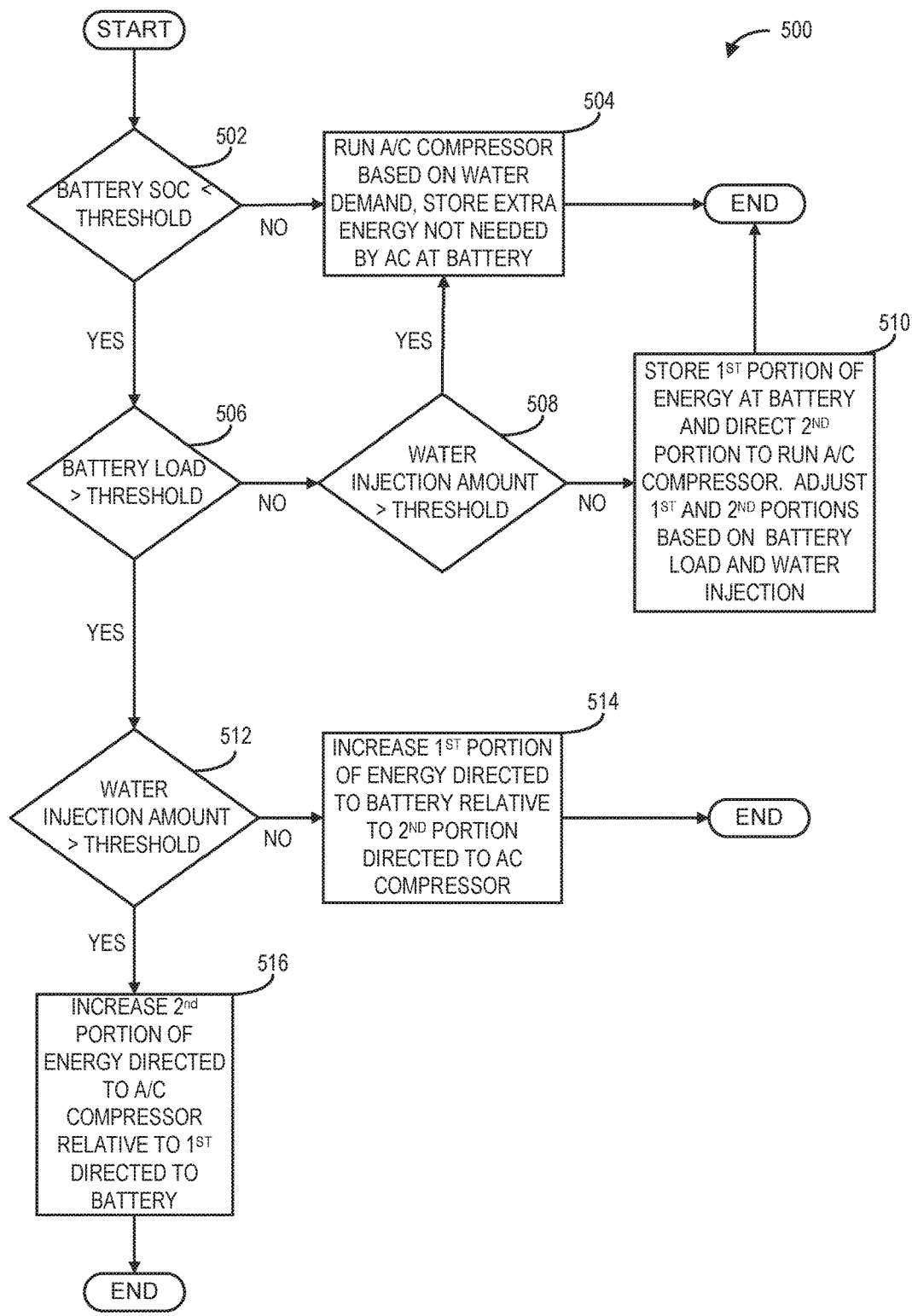
FIG. 5 shows a flow chart of a method for directing energy recovered from regenerative braking to an air conditioning compressor or a battery.
Figure 6:
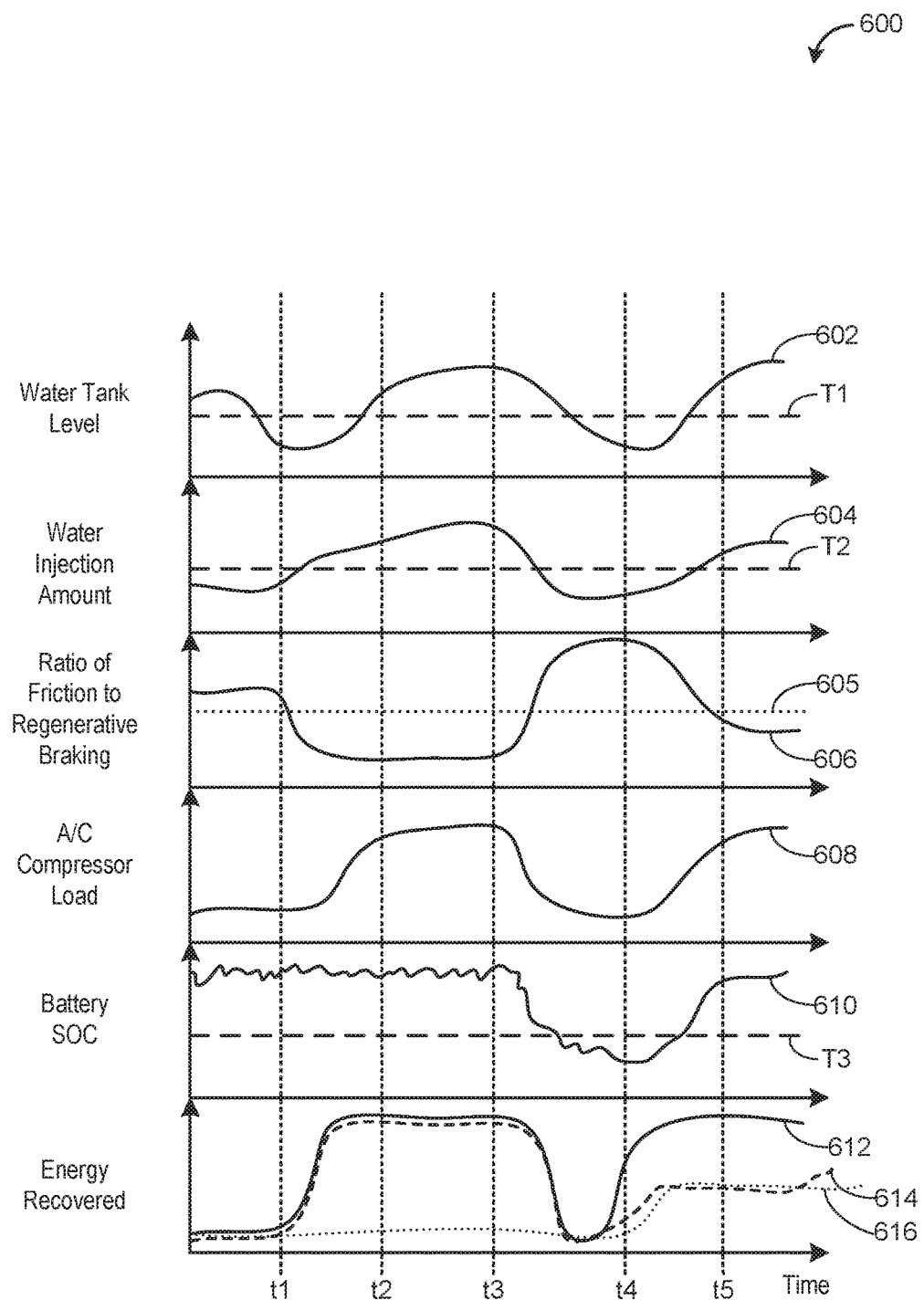
FIG. 6 shows a graph depicting adjustments to a ratio of friction to regenerative braking and an air conditioning compressor load in response to a water storage tank level and desired water injection amount.

The following description relates to systems and methods for adjusting an air conditioning (AC) compressor load and a ratio of friction to regenerative braking based on the water level in a water storage tank of a vehicle system. Energy recovered from regenerative braking during a braking event may be directed to run the AC compressor in an electric AC system to collect water for injection into an engine. Collected water may be stored in the water storage tank of a water collection system and then injected via one or more water injectors coupled with the engine. A schematic depiction of an example engine system, including a water collection system that receives collected condensate from an AC system and injects the collected water into the engine, is shown in FIG. 1. In FIG. 2, a schematic depiction of an example vehicle system is shown, including substantially the same engine system and water injection system as the one shown in FIG. 1. Additionally, FIG. 2 shows mechanical and electrical coupling amongst friction and regenerative brakes, the electric AC system, a battery, the engine, and the water collection system. By adjusting the ratio of friction to regenerative braking and the AC compressor load based on the water level in the water storage tank, electrical energy from the regenerative braking system may be used to run the AC compressor and water may be collected from running the AC system to refill the water storage tank in the water injection system in order to provide water for water injection into the engine. FIGS. 3-5 illustrate example methods for collecting condensate from the AC system by decreasing the ratio of friction to regenerative brake effort and increasing the AC compressor load. Specifically, FIG. 3 shows a method for determining whether to inject water into an engine based on engine operating conditions. FIG. 4 shows a method for collecting water (e.g., condensate or condensed water) by adjusting the ratio of friction to regenerative braking during a braking event and the AC compressor load in response to a water level in the water storage tank and engine operating parameters, including a state of charge (SOC) of a battery and a requested air conditioning level. In one example, the ratio of friction to regenerative braking may be decreased and the AC compressor load increased to increase the water collection amount in response to a low water level in the water storage tank. FIG. 5 shows a method for directing energy recovered from regenerative braking to the battery or AC compressor based on the battery SOC and a water injection amount. Finally, FIG. 6 graphically depicts adjustments to the ratio of friction to regenerative braking and the AC compressor load in response to a water storage tank level. Additionally, FIG. 6 depicts directing energy recovered from regenerative braking to the AC compressor and/or battery based on the battery SOC and desired or current water injection amount. For example, a first portion of energy stored at the battery may be increased and a second portion directed to run the AC compressor may be decreased in response to a low battery SOC and water injection amount. In this way, water condensate collection parameters may be adjusted based on the water level in the water storage tank and water injection demands of the engine. As a result, the water storage tank may be automatically refilled from condensate collected from the AC system for subsequent use in a water injection system. Additionally, energy recovered from regenerative braking may be directed to the battery and/or the AC compressor depending on water injection demands and the battery SOC. By coordinating water injection demands and battery storage level demands, both a level of water in the water storage tank and a level of electrical energy stored at the battery may be maintained at sufficient levels for operation of the hybrid vehicle and water injection system.

Turning to the figures, FIG. 1 shows an embodiment of a water injection system 60 and an engine system 100, in a motor vehicle 102, illustrated schematically. In the depicted embodiment, engine 10 is a boosted engine coupled to a turbocharger 13 including a compressor 14 driven by a turbine 16. Specifically, fresh air is introduced along intake passage 142 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve (e.g., intake throttle) 20. The CAC may be an air-to-air or air-to-coolant heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the intake manifold 22. In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers or cylinders 180 through a series of intake valves (not shown). As shown in FIG. 1, the intake manifold 22 is arranged upstream of all combustion chambers 180 of engine 10. Sensors such as manifold charge temperature (MCT) sensor 23 and air charge temperature sensor (ACT) 125 may be included to determine the temperature of intake air at the respective locations in the intake passage. In some examples, the MCT and the ACT sensors may be thermistors and the output of the thermistors may be used to determine the intake air temperature in the passage 142. The MCT sensor 23 may be positioned between the throttle 20 and the intake valves of the combustion chambers 180. The ACT sensor 125 may be located upstream of the CAC 18 as shown, however, in alternate embodiments, the ACT sensor 125 may be positioned upstream of compressor 14. The air temperature may be further used in conjunction with an engine coolant temperature to compute the amount of fuel that is delivered to the engine, for example.

The combustion chambers are further coupled to exhaust manifold 136 via a series of exhaust valves (not shown). In the depicted embodiment, a single exhaust manifold 136 is shown. However, in other embodiments, the exhaust manifold may include a plurality of exhaust manifold sections.

Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow. In one example, emission control device 70 may include a three-way catalyst (TWC).

All or part of the treated exhaust from emission control device 70 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped (e.g. taken) from downstream of turbine 16. The EGR valve 152 may be opened to admit a controlled amount of cooled exhaust gas to the compressor inlet for desirable combustion and emissions-control performance. In this way, engine system 100 is adapted to provide external, low-pressure (LP) EGR. In other embodiments, the EGR system may be a high pressure EGR system with EGR passage 151 connecting from upstream of the turbine 16 to downstream of the compressor 14. In some embodiments, the MCT sensor 23 may be positioned to determine the manifold charge temperature, and may include air and exhaust recirculated through the EGR passage 151.

The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Furthermore, combustion chamber 180 draws in water and/or water vapor, which may be injected into the engine intake by water injector 33. As shown in FIG. 1, the water injector 33 is positioned in the intake manifold 22, downstream of the throttle 20 and upstream of all the combustion chambers (e.g., cylinders) 180 of the engine 10. In another embodiment, water injector 33 may be positioned downstream of the throttle 20, in one or more intake runners (e.g., ports; not shown) leading to one of the combustion chambers 180, or in one or more combustion chambers 180 to inject water directly. In yet another embodiment, the water injection system water may include a plurality of water injectors positioned in one or more of these locations. For example, an engine may include each of a water injector positioned in an intake manifold 22, water injectors positioned at each intake runner, and water injectors positioned at each combustion chamber, in one embodiment. Water may be delivered to water injector 33 by the water injection system 60.

The water injection system 60 includes a water storage tank (or reservoir) 63, a water pump 62, and a water filling passage (e.g., manual water filling passage) 69. Additionally, water injection system 60 is coupled to water collection system 72, which extracts water (e.g., in the form of liquid condensate) from an air conditioning system, as described further below. Water stored in water storage tank 63 is delivered to water injector 33 via water passage 61. In another embodiment, water stored in water storage tank 63 may be delivered to multiple water injectors coupled to the intake, as previously described. In embodiments that include multiple injectors, water passage 61 may include one or more valves and water passages (not shown) to select between different water injectors or one or more water pumps each coupled to a water injector passage for one or more injectors. Water pump 62 may be operated by a controller 12 to provide water to water injector 33 via passage 61.

Water storage tank 63 may include a water level sensor 65, a water quality sensor 66, and a water temperature sensor 67, which may relay information to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The water quality sensor 66 may detect whether the water in water storage tank 63 is suitable for injection. As one example, water quality sensor 66 may be a conductivity sensor. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. In another example, the level of water in water tank 63 may be used to determine whether sufficient water for injection is available, as described below with reference to FIG. 3. In the depicted embodiment, water storage tank 63 may be manually refilled via water filling passage 69 and/or refilled automatically by the collection system 72 via water tank filling passage 76. Collection system 72 may be coupled to one or more components 74 that refill the water storage tank with condensate collected from various engine or vehicle systems. In one example, collection system 72 may be coupled with an EGR system to collect water condensed from exhaust passing through the EGR system. In another example, collection system 72 may be coupled with an air conditioning system (such as an electric air conditioning system as shown in FIG. 2). Manual filling passage 69 may be fluidically coupled to a filter 68, which may remove small impurities contained in the water that could potentially damage engine components.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input (e.g., pedal position), brake input, transmission selector position, vehicle speed, engine speed, mass airflow through the engine, boost pressure, ambient temperature, ambient humidity, intake air temperature, fan speed, etc.), cooling system sensors (such as ECT sensor, fan speed, passenger compartment temperature, ambient humidity, etc.), CAC 18 sensors (such as CAC inlet air temperature, ACT sensor 125 and pressure, CAC outlet air temperature, MCT sensor 23, and pressure, etc.), knock sensors 183 for determining ignition of end gases and/or water distribution among cylinders, water injection system sensors (such as water level sensor 65, water quality sensor 66, and water temperature sensor 67), and others. Furthermore, controller 12 may communicate with various actuators 32, which may include engine actuators (such as fuel injectors, an electronically controlled intake air throttle plate, spark plugs, water injectors, water pumps, etc.). In some examples, the storage medium (e.g., memory) may be programmed with computer readable data representing instructions executable by the processor for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, injecting water to the engine may include adjusting an actuator of injector 33 to inject water and adjusting water injection may include adjusting an amount or timing of water injected via the injector. In another example, collecting condensate for a water injection system 60 may include adjusting the operation of water collection system 72, such as an air conditioning system.

FIG. 2 shows an example embodiment of an air conditioning system 240 coupled to a regenerative braking system 260 in a hybrid electric vehicle 202, illustrated schematically. The hybrid electric vehicle 202 shown in FIG. 2 may have similar elements to vehicle 102 shown in FIG. 1, such as engine 10 shown in FIG. 1. As such, similar components in FIG. 2 to those of FIG. 1 are labelled similarly and are not re-described below for the sake of brevity.

Hybrid electric vehicle system 202 includes an internal combustion engine 10, energy conversion devices 212 and 216, such as electric motors, hydraulic motors, or flywheels, which may be included in a regenerative braking system 260, an air conditioning system 240, and a water collection system 72. Further, vehicle system 202 may include final drive/wheels 218, which may contact a road surface. Additionally, wheels 218 may include brakes (e.g., friction brakes) 222 to provide the vehicle system 202 with friction braking. Energy conversion devices 212 and 216 may be configured to utilize or consume a different energy source than engine 10. For example, engine 10 may consume a liquid fuel (e.g. gasoline) to produce an engine output while electric energy conversion devices 212 and 216 may operate as motors and convert electric energy into output torque. As such, vehicle system 202 may be referred to as a hybrid electric vehicle (HEV). Further, electric energy conversion devices 212 and 216 may operate as generators and convert torque into electric energy. Note that electric energy conversion devices 212 and 216 may be referred to herein as at least one of a motor and a generator. In some embodiments, an energy conversion device, such as an inverter, may be coupled between the battery and a motor, such as motors 212 and 216, to convert the DC output of the battery into an AC output for use by motor. However, in alternate embodiments, the inverter may be configured in the electric motor. In one example, the first electric energy conversion device 212 may be a crank integrated starter generator (CISG). CISG 212 may be connected at the output of engine 10 and further may be connected to transmission 214, thus providing starter/generator capabilities. In some embodiments, a torque converter may be disposed between the output of CISG 212 and the input of the transmission. The second electric energy conversion device 216 may be an electric rear axle drive (ERAD) device. ERAD 216 may be coupled to the driveline downstream of the output of transmission 214 and may supply torque to drive wheels 218. In some embodiments, ERAD 216 may transmit torque to the driveline via a drive belt or other suitable mechanism. In some embodiments, ERAD 216 may transmit torque to the driveline via a planetary gear set which may be connected to the drive wheels 218, thus providing propulsion capabilities in either an electric drive or hybrid drive mode.

Vehicle system 202 may utilize a variety of different operational modes depending on operating conditions encountered to propel or decelerate (e.g. braking in response to an operator request via depressing a brake pedal of the vehicle, in one example) the vehicle. Some of these modes may enable engine 110 to be maintained in an off state (i.e. set to a deactivated state) where combustion of fuel at the engine is discontinued. For example, during select operating conditions, engine 10 may be operated to propel the vehicle 202 via drive wheels 218 while motor 120 is deactivated. Engine 10 may be operated by combusting fuel received from fuel system (not shown). Under other operating conditions, motor 120 may propel the vehicle via drive wheels 218 while engine 10 is deactivated. During still other operating conditions when a vehicle is not accelerating, such as a braking event, engine 10 may be set to a deactivated state while ERAD 216 may be operated to charge energy storage device 220. For example, ERAD 216 may receive wheel torque from drive wheels 218, where the motor may convert the kinetic energy of the vehicle to electrical energy for storage at energy storage device 220. This operation may be referred to as regenerative braking of the vehicle. Thus, ERAD 216 can provide a generator function in some embodiments. However, in other embodiments, CISG 212 may instead receive wheel torque from drive wheel 218, where the generator may convert the kinetic energy of the vehicle to electrical energy for storage at energy storage device 220. In this way, CISG 212 and ERAD 216 may be in electric communication with energy storage device 220.

In the depicted embodiment, energy storage device 220 is a system battery. In some embodiments, battery 220 may be configured to store electrical energy that may be supplied to other electrical loads residing on-board the vehicle (other than the motor), including cabin heating and air conditioning, engine starting, headlights, cabin audio and video systems, etc. For example, in the depicted embodiment, battery 220 and CISG 212 are further electrically coupled to air conditioning system 240 to provide electrical energy from regenerative braking system 260 to the air conditioning system 240.

Air conditioning system 240 includes a compressor 230, a condenser 232, and an evaporator 236 for providing cooled air to the vehicle passenger compartment 204. Compressor 230 receives refrigerant gas from evaporator 236 and pressurizes the refrigerant. Energy to drive compressor 230 is supplied by an energy source. In one example, energy to power compressor 230 is supplied by an energy storage device, such as battery 220. In another example, energy to drive compressor 230 is supplied by an energy conversion device, such as CISG 212. For example, an energy conversion device, such as CISG 212, may receive energy from a plurality of sources, including one or more of engine 10, regenerative braking system 260, or battery 220. Mechanical wheel power and engine power may be transferred via transmission 214. Then, the energy supplied by the energy conversion device powers an electrical motor to run compressor 230. In this way, energy is supplied to the AC compressor via an electric motor to pressurize refrigerant. Heat is extracted from the pressurized refrigerant so that the refrigerant is liquefied at condenser 232. A drier 233 may be coupled to condenser 232 to reduce undesired moisture (e.g. water) from the air conditioning system 240. In some embodiments, drier 233 may include a filter (not shown) to remove particulates. After being pumped into condenser 232, refrigerant is supplied to evaporator 236 via evaporator valve 234. The liquefied refrigerant expands after passing through evaporator valve 234 causing the temperature of evaporator 236 to be reduced. In this way, air temperature may be reduced by passing the air over evaporator 236 via fan 237. Evaporator 236 is further fluidically coupled to water collection system 72, which is substantially similar to water collection system 72 shown in FIG. 1, to extract water from the air conditioning system 240 for water injection into engine 10. Condensate forms at evaporator 236 as air is cooled and the condensate is then delivered to the water collection system 72 via a condensate drain 238 and water tank filling passage 76.

Then, cooled air from evaporator 236 may be directed to passenger compartment 204 through ventilation duct 291, illustrated by arrows. Controller 12 operates fan 237 according to operator settings, which may be inputted using vehicle instrument panel 198, as well as climate sensors. Within the passenger compartment (e.g. cabin), a vehicle operator or passenger may input desired air conditioning parameters via a vehicle instrument panel 198. In one example, the vehicle instrument panel 198 may comprise one or more of input portions for receiving an operator input, such as buttons, touch screens, voice input/recognition, etc. In the depicted example, vehicle instrument panel 198 may include input portions for receiving operator input for the air conditioning system 240 (e.g. on/off state of the air conditioning system, desired passenger compartment temperature, fan speed, and distribution path for conditioned cabin air). Further, the vehicle instrument panel 198 may include one or more of indicator lights and/or a text-based display with which messages are displayed to an operator. In another example, a plurality of sensors 30 may include one or more climate sensors, which may indicate the temperature of evaporator 236 and passenger compartment 204, as well as ambient temperature, to controller 12. Further, sensors 30 may include humidity sensors to measure the humidity of passenger compartment 204, as well as the humidity of air passed through air conditioning system 240.

FIG. 2 further shows a control system 28. Control system 28 is substantially similar to control system 28 shown in FIG. 1, including controller 12, which may receive input from a plurality of sensors 30 and may communicate with various actuators 32. The controller 12 receives signals from the various sensors of FIG. 2 and employs the various actuators of FIG. 2 to adjust engine and electric motor operation based on the received signals and instructions stored on a memory of the controller. For example, collecting water from an air conditioning system may include adjusting a ratio of friction to regenerative braking, such as brakes 222 and regenerative braking system 260. As referred to herein, the ratio of friction to regenerative braking is a ratio of the amount of brake effort being applied via the friction brakes to the amount of brake effort being applied via the regenerative brake system. In one example, braking effort is braking power. In another example, an amount of braking effort is an amount of brake torque. The controller may receive signals from sensors, such as signals about an amount of brake pedal depression, a battery SOC, or a water level in a water storage tank and may employ actuators of the friction brakes and the regenerative braking system, for example via electric motors, to adjust the ratio of friction to regenerative braking. In one example, the controller may decrease the ratio of friction to regenerative braking in response to a signal from the battery that the battery is capable of storing charge (e.g. a battery SOC or battery power limit is below an upper threshold). In another example, the controller may decrease the ratio of friction to regenerative braking in response to a signal from a water level sensor of a water storage tank, such as water level sensor 65 shown in FIG. 1. In yet another example, the controller may increase the ratio of friction to regenerative braking in response to signals that a battery SOC and/or battery power limit is above the upper threshold and a water level in the water storage tank is above an upper threshold. Further, collecting condensate from an air conditioning system may include adjusting an air conditioning compressor load of compressor 230 and extracting condensed water from condenser 232. Specifically, decreasing the ratio of friction to regenerative braking and running the AC compressor 230 may increase the amount of condensate at condenser 232, thereby increasing an amount of water available for collection from the AC system 240.

In this way, the systems of FIGS. 1 and 2 present example systems that may be used to extract water (e.g., condensate) from an electric air conditioning system and store collected water for injection at the engine from a water injection system. Use of a water injection system may be limited by the amount of water stored in a water storage tank. Thus, by coupling an air conditioning system to a water collection system to collect water at a condenser of an air conditioning system, as shown in FIGS. 1 and 2, a water collection system may supply water for the water injection system. Collecting water for a water collection system may be adjusted in response to one or more of a water storage level, water injection demands, and various engine operating parameters, as shown in the methods presented at FIGS. 3-5. For example, the air conditioner compressor load and ratio of friction to regenerative braking torque during braking may be adjusted to collect water for the water collection system in response to one or more of a water level in a water storage tank and a state of charge of a battery, as shown in the methods presented at FIGS. 4 and 5.

Turning to FIG. 3, an example method 300 for injecting water into an engine is depicted. Instructions for carrying out method 300 and the rest of the methods included herein may be executed by a controller (such as controller 12 shown in FIGS. 1-2) based on instructions stored on a memory of the controller and in conjunction with signals received from sensors of the engine system, such as the sensors described above with reference to FIG. 1, and/or of the regenerative braking system of the hybrid vehicle, such as the sensors described above with reference to FIG. 2. The controller may employ engine actuators of the engine system to adjust engine operation, according to the methods described below. In one example, water may be injected via one or more water injectors using water stored in a water storage tank of a water injection system (such as water storage tank 63 of water injection system 60 shown in FIG. 1).

The method 300 begins at 302 by estimating and/or measuring engine operating conditions. Engine operating conditions may include manifold pressure (MAP), air-fuel ratio (A/F), spark timing, fuel injection amount or timing, an exhaust gas recirculation (EGR) rate, mass air flow (MAF), manifold charge temperature (MCT), engine speed and/or load, an engine knock level, etc. Next, at 304, the method includes determining whether water injection has been requested. In one example, water injection may be requested in response to a manifold temperature being greater than a threshold level. Additionally, water injection may be requested when a threshold engine speed or load is reached. In yet another example, water injection may be requested based on an engine knock level being above a threshold. Further, water injection may be requested in response to an exhaust gas temperature above a threshold temperature, where the threshold temperature is a temperature above which degradation of engine components downstream of cylinders may occur. In addition, water may be injected when the inferred octane number of used fuel is below a threshold.

If water injection has not been requested, engine operation continues at 306 without injecting water. Alternatively, if water injection has been requested the method continues at 308 to estimate and/or measure water availability for injection. Water availability for injection may be determined based on the output of a plurality of sensors, such as a water level sensor and/or a water temperature sensor disposed in the water storage tank of the water injection system of the engine (such as water level sensor 65 and water temperature sensor 67 shown in FIGS. 1-3). For example, water in the water storage tank may be unavailable for injection in freezing conditions (e.g., when the water temperature in the tank is below a threshold level, where the threshold level is at or near a freezing temperature). In another example, the level of water in the water storage tank may be below a threshold level, where the threshold level is based on an amount of water required for an injection event or a period of injection cycles. In response to the water level of the water storage tank being below the threshold level, refilling of the tank may be indicated. At 310, the method includes determining whether water is available for injection. If water is not available for injection, the method continues at 312 to adjust engine operating parameters to collect water. This may include collecting water from vehicle systems, such as an electric air conditioning system as described below with regard to FIGS. 4 and 5. The method at 312 may further include storing the collected water at the water storage tank. In one embodiment, additionally, the controller may send a notification to a vehicle operator to manually refill the tank. However, if water is available for injection, the method continues at 314 to inject water (stored in the water storage tank) based on the water injection request. Injecting water may include actuating, via a controller, an actuator of one or more water injectors (such as water injector 33 shown in FIG. 1) of the engine to inject water stored in the water storage tank into an intake manifold (or other location in the intake of the engine and/or in engine cylinders of the engine). Injecting water may include injecting a requested amount of water over a duration or as one or more pulses.

FIG. 4 shows an example method 400 for extracting water (e.g., in the form of condensate) from an electric air conditioning system of a vehicle. As described above, water for a water injection system may be collected from an on-board system, such as an air conditioning system (e.g., air condition system 240 shown in FIG. 2). Extracting condensate from the air conditioning system, such as air conditioning system 240 shown in FIG. 2, may include extracting water using a water collection system, such as the water collection system 72 shown in FIGS. 1 and 2.

The method 400 begins at 402 by estimating and/or measuring vehicle operating conditions. Vehicle operating conditions may include engine operating conditions, such as manifold pressure (MAP), air-fuel ratio (A/F), spark timing, fuel injection amount or timing, water injection amount or timing, and engine speed and/or load. Additionally, during a regenerative braking event an engine may be in a deactivated state, as described previously with reference to FIG. 1. Other vehicle operating conditions may include water level in a water storage tank, braking amount, state of charge (SOC) of an energy storage device of the vehicle such as a vehicle battery, battery power limits, etc. The water level in the water storage tank may be determined based on output from a sensor, such as a water tank level sensor disposed in a water storage tank of a water injection system of the engine (such as water level sensor 65 shown in FIG. 1). For example, the water level of the water storage tank may be measured via a sensor coupled inside the tank. Next, at 404, the method includes determining whether the water level in the water storage tank is below a threshold level. In one example, the threshold level is based on an amount of water required (e.g., requested) for a requested injection event or a period of injection cycles. In another example, the threshold level of water in the water storage tank may be a set level that is greater than zero but less than a full water tank level.

If the water level is below the threshold level, the method continues at 406 to determine whether a braking event is occurring. A braking event may be occurring if the controller receives a signal from a vehicle operator requesting braking of the vehicle (e.g., a signal generated from depression of a brake pedal of the vehicle). For example, the braking event may be initiated by the vehicle operator depressing the brake pedal of the vehicle. In response to the controller receiving the signal generated from depression of the brake pedal, the controller brakes the vehicle via either sending a signal to an actuator of the friction brakes (such as friction brakes 222 shown in FIG. 2) or the regenerative braking system (such as regenerative braking system 260 shown in FIG. 2). If a braking event is not occurring, then at 410 the method includes collecting water for injection from an alternate system of the vehicle. The method at 410 may include extracting condensate from another water collection system of the vehicle, such as an exhaust gas recirculation system, in one example. Additionally or alternatively, the method at 410 may include indicating a refill request for the water storage tank. In one example, the controller may send a notification (e.g., a visual indication or audible signal) to the vehicle operator to manually refill the water storage tank.

Alternatively at 406, if braking is occurring, the method continues at 414 to determine whether a battery of the vehicle is able to store energy. As explained above, the battery may be a battery of a hybrid vehicle that is used to store energy and use stored energy to at least partially operate the vehicle. The battery may be capable of accepting charge when the SOC of the battery is below a threshold SOC (e.g., an upper threshold SOC). Conversely, the battery may not be able to store additional charge (that is, the battery may be at a charge limit) when the SOC of the battery is above a threshold SOC (e.g., a lower threshold SOC). Further, the battery may be capable of accepting charge when a power limit of a battery is below a threshold battery power limit (e.g., an upper threshold power limit). The power limit of a battery may include one or more of the SOC of the battery, an amount of current of the battery, an age of the battery, and/or the battery temperature. In one example, the battery may not be able to accept further charge, or may have decreased battery charge limit, when the battery temperature is not within a threshold temperature range. The threshold temperature range may include a range of temperatures between an upper threshold temperature and a lower threshold temperature. For example, the temperature at the battery may be above (e.g., above the upper threshold temperature) or below (e.g., below the lower threshold temperature) the threshold temperature range for storing electrical energy and thus unable to store more energy.

If the battery is not able to store energy, then at 418 the method includes decreasing the ratio of friction to regenerative braking and running the air conditioning compressor. As described previously, the ratio of friction to regenerative braking is a ratio of the amount of brake torque being applied via the friction brakes to the amount of brake torque being applied via the regenerative brake system. In one example, decreasing the ratio of friction to regenerative braking includes decreasing the amount of friction braking relative to the amount of regenerative braking. In another example, decreasing the ratio of friction to regenerative braking includes increasing the amount of regenerative braking relative to the amount of friction braking. In yet another example, decreasing the ratio of friction to regenerative braking includes decreasing the amount of friction braking and increasing the amount of regenerative braking. For example, the controller may determine a control signal to send to actuators of the friction brakes and the regenerative brake system based on the determined amount of decreasing the ratio of friction to regenerative braking. Additionally, as one example, running the AC compressor at 418 includes using energy recovered from regenerative braking to run the AC compressor and/or adjust the AC compressor load. For example, adjusting the AC compressor loading may include one or more of adjusting the power, speed, and/or torque of the AC compressor. In one example, running the AC compressor at 418 may include adjusting the AC compressor power. Further, at 418, the amount by which the ratio of friction to regenerative braking is decreased increases as the level of water in the water storage tank decreases. As the ratio of friction to regenerative braking decreases, the surplus energy recovered is directed to the AC compressor and is not stored at the battery. In this way, energy recovered from regenerative braking is used to run the AC compressor, such that additional energy (e.g. energy stored at the battery or energy generated from the engine) is not needed to run the AC compressor for water collection from the AC system.

If the battery is able to store energy at 414, the method continues at 422 to decrease the ratio of friction to regenerative braking, run the AC compressor based on water demand, and store extra energy not needed by the AC compressor at the battery, according to the method 500 described further below with regard to FIG. 5. Both the method at 418 and the method at 422 continue at 428.

At 428, the method includes collecting water from the air conditioning system and storing the water in the water storage tank. For example, collecting water from the AC system includes collecting condensate that forms at an evaporator of an AC system (such as evaporator 236 shown in FIG. 2) as air is passed over the evaporator to cool the air and then directing the collected condensate (e.g., via a water passage) to the water storage tank. Then, at 430, the method includes determining whether air conditioning was requested. In one example, air conditioning may be requested by a vehicle operator using a control panel in a passenger compartment of a vehicle (such as control panel 298 shown in FIG. 2). For example, the controller may receive a signal from the control panel requesting that the AC system be turned on and operated at a set temperature level. If AC has been requested at 430, then at 434 the method includes decreasing the blending of warm air while running the AC compressor. For example, if AC has been requested, the controller may run the AC compressor for water collection and to cool the passenger compartment.

However, in one example, a desired passenger compartment temperature, based on a signal received by the controller from the control panel, may be higher relative to the temperature of cooled air passing over the evaporator. In response to the desired passenger compartment temperature being warmer than the AC system air, the controller may blend an amount of warm air (e.g., such as ambient air or air from under a hood of the vehicle) with the cooled air of the AC system and then direct the blended air to the passenger compartment, where the amount of warm air is based on an amount needed to reach a set temperature level. In one example, the controller may decrease the amount of warm air blending as the difference between the set passenger compartment temperature and the AC air temperature decreases. In this way, the controller may run the AC compressor to collect water while still provided cooled air of the desired temperature to the passenger compartment of the vehicle. If AC has not been requested at 430, the method continues at 432 and includes increasing the blending of warm air to a threshold. The threshold amount of warm air blending may be based on input signals from a vehicle operator regarding a desired passenger compartment temperature and output of a plurality of sensors, such as sensors for ambient temperature and passenger compartment temperature. For example, the controller may receive signals from an AC temperature sensor, a passenger compartment temperature sensor, and an ambient air temperature sensor. In one example, if AC has not been requested, the controller may increase the amount of warm air blending as the difference between the passenger compartment temperature and the AC air temperature increases. Additionally, or alternatively, the controller may vent the cooled air from the AC and not direct the cooled air to the passenger compartment.

If, at 404, the water level in the water storage tank is not below the threshold level, the method continues at 408 to determine whether a braking event is occurring. If braking is not occurring, then the method includes continuing engine operation at 412. For example, the current engine operation may be maintained without adjusting operating of the AC system different than requested by the vehicle operator. Additionally, if the AC system is running during engine operation when braking is not occurring, water may still be collected for the water injection system if the water storage tank is able to store water. For example, the controller may send a control signal to a water collection system actuator when the AC system is running to collect water based on the water level in the water storage tank. In this way, water may opportunistically be collected from the AC system during AC system operation if the water storage tank can store water.

However, if there is a braking event at 408, the method continues at 416 where the method includes determining whether the battery is able to store charge, as described above with reference to the method at 414. If the battery is not able to store energy, the method continues to 420 where the method includes increasing the ratio of friction to regenerative braking. In one example, increasing the ratio of friction to regenerative braking includes increasing the amount of friction braking relative to the amount of regenerative braking. In another example, increasing the ratio of friction to regenerative braking includes decreasing the amount of regenerative braking relative to the amount of friction braking. In yet another example, increasing the ratio of friction to regenerative braking includes increasing the amount of friction braking and decreasing the amount of regenerative braking. Instead, if the battery is able to store energy, the method continues to 424 which includes decreasing the ratio of friction to regenerative braking (similar to the method at 418, as described above). Both the method at 420 and the method at 424 continue at 426 where the method includes operating the AC compressor based on an operator request only. For example, the controller may determine the operational load of the AC compressor based on the operator input (e.g. a set temperature for the AC system and a current passenger compartment temperature) and not based on the water level in the water storage tank. Specifically, the controller may make a logical determination of the desired AC compressor load based on logic rules that are a function of the operator input (e.g., temperature request or on/off state of the AC system) and not the water level. Then, the controller may send a signal based on the logical determination to an actuator of the AC compressor to run the AC compressor based on the determined operational load. In this way, method 400 shows a method for collecting condensate from an electric AC system. As the AC compressor load increases (e.g., as the AC compressor is run at a higher level and more electrical energy is directed to the AC compressor), more condensate may be extracted from the AC system for use in the water injection system. During a braking event, the regenerative braking system may be opportunistically used to brake the vehicle, convert the braking torque into electrical energy, and use the electrical energy for running the AC compressor so that more water may be collected at the water storage tank.

FIG. 5 shows an example method 500 for directing portions of the energy generated by regenerative braking to the battery of the vehicle and/or the AC compressor of the electric AC system. The method 500 continues from the method at 422 of FIG. 4 in response to determining that the water level in the water storage tank is below the threshold water level and the battery is able to store charge.

Method 500 starts at 502 by determining whether the battery SOC is below a threshold SOC. The threshold SOC may be a level that is lower than the level referred to at 414 of method 400 for determining whether the battery is able to store any charge. For example, the threshold SOC at 502 may be a lower threshold SOC below which the battery may not have enough electrical energy stored for meeting future electrical demands of the vehicle (e.g., for propelling the vehicle). If the battery SOC is not less than the threshold SOC, then the method continues at 504 and includes running the AC compressor based on water demand and storing extra energy not needed by the AC compressor at the battery. For example, the controller may operate the AC compressor to collect condensate based on the water level in the water storage tank and/or a water injection amount from the water injection system. The controller may make a logical determination of a control signal to send to an AC compressor actuator, such as an AC compressor load, based on logic rules that are a function of a determined water demand. The controller may determine the water demand based on signals received from water injection system sensors, such as a water level sensor, about the water level in the water storage tank and a water injection amount/rate. For example, the controller may make a logical determination of the water demand based on logic rules that are a function of the water level of the water storage tank and/or a water injection amount/rate being injected by the water injectors. In one example, the controller may increase the AC compressor load as the water level decreases in order to increase water collection. In another example, the controller may increase the AC compressor load as the water injection amount (e.g. a current water injection amount into an engine or a requested amount to be injected) increases. Additionally, the controller may direct any surplus energy recovered from regenerative braking not needed by the AC compressor to be stored at the battery.

Alternatively at 502, if the battery SOC is below the threshold SOC, the method continues at 506 to determine whether the battery load is above a threshold battery load. The battery load may the amount of energy being pulled from the battery and used by other vehicle components. The threshold battery load may be based on a level of electrical demand where the amount of energy stored at the battery may be used to power one or more electrical components of the vehicle. For example, the battery load may be above the threshold battery load when the electrical demand of one or more electrical components of the vehicle is high. If the battery load is not greater than the threshold battery load, then at 508 the method includes determining whether the water injection amount is greater than a threshold water injection amount. The water injection amount may be a current amount of water (or rate of water) being injected (or requested to be injected) into the engine via one or more water injectors of the water injection system. The threshold water injection amount may be based on a current water level of the water storage tank such that a desired water injection amount above this threshold may result in depletion of water in the water storage tank. If the injection amount is greater than the threshold water injection amount, the method continues to 504 to run the AC compressor based on water demand and store extra energy not needed by the AC at the battery, as described above. However, if the water injection amount is not greater than the threshold, the method continues at 510. At 510, the method includes storing a first portion of energy recovered from regenerative braking at the battery and directing a second, remaining portion of the energy to run the AC compressor, where the first and second portions are adjusted based on the battery load and water injection amount/rate (e.g., the amount or rate of water being injected into the engine via the water injection system. In one example, the first portion is an amount of the energy recovered from regenerative braking that is needed to reach an upper level of battery SOC. The upper SOC may be a level that is higher than the level referred to at 414 of method 400 for determining whether the battery is able to store any charge. In one example, the first portion of energy stored at the battery at 510 may be a battery SOC level above which the battery is able to meet the electrical demands of the vehicle. In another example, the first portion of energy stored at the battery at 510 may be a battery SOC level above which the battery may not be able to store additional charge (e.g. a charge limit of the battery). The second portion of energy that is directed to run the AC compressor is energy recovered by regenerative braking that is not needed for storage at the battery. For example, the controller may determine the amount of energy in the first and the second portions based on signals received from sensors regarding the battery SOC, battery load, and water injection amount/rate. For example, in response to signals received about a battery SOC, the controller may increase the first portion of energy stored at the battery as the battery SOC decreases. Conversely, the controller may decrease the first portion of energy stored at the battery and increase the second portion directed to run the AC compressor as the battery SOC increases. In another example, the controller may decrease the first portion stored at the battery and increase the second portion directed to the AC compressor as the water injection amount/rate increases. In this way, the energy recovered from regenerative braking may be used to charge the battery and the AC system may consume the surplus energy recovered to run the AC compressor for water collection.

If the battery load is greater than the threshold at 506, the method continues at 512 to determine whether the water injection amount (or rate) is above the threshold water injection amount (or rate). The threshold water injection amount (or rate) may be the same threshold as described above with reference to the method at 508. If the water injection amount is not above the threshold, the method continues at 514 to increase the first portion of energy directed to the battery relative to the second portion of the energy directed to the AC compressor. In this way, a larger amount of the energy recovered via the regenerative braking system during the braking system may be stored at the battery than used to run the AC compressor. As a result, less water may be collected from the AC system for water injection than when the second portion is higher than the first portion. If the water injection amount is above the threshold, the method continues at 516 to increase the second portion of energy directed to the AC compressor relative to the first portion directed to the battery. In this way, a larger second portion of the energy recovered from regenerative braking is directed to run the AC compressor. As a result, more water may be collected from the AC system for water injection. Additionally, less energy may be stored at the battery than when the first portion is larger than the second portion.

Finally, FIG. 6 shows a graph 600 depicting adjustments to a ratio of friction to regenerative braking torque and an AC compressor load in response to a water level in a water storage tank and various engine operating conditions. The water storage tank may be a water storage tank of a water injection and water collection system, as described above. The AC compressor may be part of an electric AC system, such as the AC system described above. Further, water for water injection may be collected from the AC system, as the AC compressor is run, and stored at the water storage tank. The operating parameters illustrated in the graph 600 include water tank level at plot 602, water injection amount (injected via one or more water injectors of the water injection system) at plot 604, the ratio of friction to regenerative braking at plot 606, battery SOC at plot 610, an AC compressor load of the AC compressor at plot 608, and a total amount of energy recovered from the regenerative braking system at plot 612 (depicted as a solid line), with the portion of recovered energy directed to the AC compressor at plot 614 (depicted as a dashed line) and portion stored at the battery at plot 616 (depicted as a dotted line). A dotted line 605 corresponds to a ratio of friction to regenerative braking equal to 1. Thresholds for various operating parameters (such as water level, water injection amount, and battery SOC) are depicted as a dashed horizontal line. For each operating parameter, time is depicted along the horizontal axis and values of each respective operating parameter are depicted along the vertical axis.

Prior to time t1, the water level (plot 602) in the water storage tank of the water injection system decreases such that, at time t1, the water level is below a threshold T1. The water level in the water storage tank may be indicated by a water level sensor (such as water level sensor 65 shown in FIG. 1). Additionally at time t1, a braking event is occurring. In response to the water level in the water storage tank being less than the threshold T1 while braking is occurring, the controller decreases the ratio of friction to regenerative braking (plot 606) and collects water for the water injection system from the AC system at time t1. Since a SOC of the battery is above a threshold T3 and cannot accept additional charge, the controller directs all energy recovered by regenerative braking to the AC compressor (plots 612-616). As a result of decreasing the ratio of friction to regenerative braking and running the AC compressor with the recovered energy to collect water, the water level in the water storage tank (plot 602) increases above the threshold T1 by time t2.

At time t3, braking is occurring. In response to the water level in the water storage tank (plot 602) being above the threshold T1 and the battery SOC above the threshold T3 (plot 608), the controller increases the ratio of friction to regenerative braking at time t3. As a result, the energy recovered via regenerative braking (plot 612) decreases after time t3. Additionally, the controller decreases the AC compressor load (plot 610) in response to AC not being requested by a vehicle operator. In another example, the controller may operate the AC compressor in response to a request for air conditioning in a vehicle passenger compartment. Further, the water injection amount (plot 604) increases from time t1 to time t3. Subsequently, the water level in the water storage tank decreases between time t3 and time t4.

At time t4, the water level in the water storage tank is below the threshold T1 and braking is occurring. Additionally, the battery is able to store charge (e.g. the battery SOC is below the threshold T3). In response to the water level below the threshold T1 (plot 602) and the SOC of the battery below the threshold T3 (plot 608), the controller decreases the ratio of friction to regenerative braking and runs the AC compressor to collect water (e.g., even if the operator has not requested AC or the temperature of the vehicle cabin is cooler than a temperature demanded via the operator). Further, the controller stores a first portion of the total energy recovered from regenerative braking (plot 612) at the battery (plot 616) and a second portion is directed to the AC compressor (plot 614) based on the water injection system demands and the battery load. For example, the controller may increase the first portion of energy stored at the battery and decrease the second portion directed to the AC compressor as the battery load increases. In another example, the second portion of energy directed to the AC compressor may increase as the water level in the water storage tank decreases below the threshold T1 and/or the water injection amount increases above a threshold T2. At time t5, as a result of decreasing the ratio of friction to regenerative braking and directing the first portion of energy to the AC compressor and storing the second portion at the battery, the battery SOC and water level in the water storage tank increases.

In this way, the ratio of friction to regenerative braking torque in a hybrid vehicle and an air conditioning compressor load may be adjusted to collect water from the air conditioning system for a water injection system based on a water level in a water storage tank. Additionally, an air conditioning compressor may be operated when excess energy is available to collect water from the electric AC system. For example, during a braking event, the ratio of friction to regenerative braking may be decreased in response to the water level being below a threshold. By adjusting the ratio of friction to regenerative braking and operating the AC compressor, water may be collected for water injection, even when the SOC of a battery is above a threshold level. As a result, water for water injection may be collected as needed during a braking event, without using additional energy to run the AC compressor (e.g., only energy recovered from braking may be used to run the AC compressor to generate and collect water at the water storage tank). This may reduce a likelihood of running out of water for water injection. Further, collecting water from the AC system in this way may reduce a burden on a vehicle operator for refilling the water storage tank. Additionally, energy recovered from regenerative braking may be directed to the AC compressor and/or a battery in response to a battery SOC, the water level in the water storage tank, and a water injection amount, thereby providing energy as needed to both the AC compressor and battery. By coordinating the electrical demands the battery with the water storage needs of the water injection system, both a battery SOC and water storage tank level may be maintained at sufficient levels for operating the systems of the vehicle. The technical effect of adjusting the ratio of friction to regenerative braking and the AC compressor load during a braking event is to provide electrical energy recovered from a regenerative braking system to the AC system, even when the battery SOC is high and AC has not been requested by a vehicle operator. Additionally, the technical effect of adjusting the AC compressor load based on the water level of the water storage tank is to provide water for water injection into an engine.

As one embodiment, a method includes adjusting an AC compressor loading of an electric AC system and a ratio of friction to regenerative brake effort during braking based on a level of water in a water reservoir coupled to a water injection system. In a first example of the method, the method further includes wherein adjusting the AC compressor load and ratio of friction to regenerative brake effort during braking includes running an AC compressor of the electric AC system to increase the AC compressor load and decreasing the ratio of friction to regenerative brake effort in response to the level of water being below a threshold water level. A second example of the method optionally includes the first example and further comprises in response to a state of charge of a battery of the hybrid vehicle system being greater than a threshold state of charge, transferring all energy from regenerative braking to the AC compressor and not storing energy from regenerative braking at the battery; and wherein an amount of decreasing the ratio of friction to regenerative brake effort increases as the level of water decreases further below the threshold water level. A third example of the method optionally includes one or more of the first and second examples, and further comprises, in response to a state of charge of a battery of the hybrid vehicle system being less than a threshold state of charge, decreasing the ratio of friction to regenerative brake effort to generate energy and storing a first portion of the generated energy at the battery and using a remaining, second portion of the generated energy to run the AC compressor. A fourth example of the method optionally includes one or more of the first through third examples, and further includes wherein the first portion and second portion are based on an amount of water being injected via the water injection system. A fifth example of the method optionally includes the first through fourth examples, and further comprises collecting water produced by the electric AC system during running the AC compressor and storing the collected water at the water reservoir. A sixth example of the method optionally includes the first through fifth examples, and further comprises injecting the water stored at the water reservoir into one or more of an intake manifold, an intake runner of an engine cylinder, and an engine cylinder via one or more water injectors of the water injection system based on engine operating conditions. A seventh example of the method optionally includes the first through sixth examples, and further comprises, in response to AC not being requested by a user at a cabin of the hybrid vehicle system during the braking and running the AC compressor in response to the level of water being below the threshold, increasing bleeding of warmer air into the cabin. An eighth example of the method optionally includes the first through seventh examples, and further includes wherein adjusting the AC compressor load and ratio of friction to regenerative brake effort during braking includes running an AC compressor of the electric AC system based on an operator request only and not based on the level of water and decreasing the ratio of friction to regenerative brake effort in response to the level of water being above a threshold water level and a state of charge of a battery of the hybrid vehicle system being less than a threshold state of charge. A ninth example of the method optionally includes the first through eighth examples, and further includes wherein adjusting the AC compressor load and ratio of friction to regenerative brake effort during braking includes running an AC compressor of the electric AC system based on an operator request only and not based on the level of water and increasing the ratio of friction to regenerative brake effort in response to the level of water being above a threshold water level and a state of charge of a battery of the hybrid vehicle system being greater than a threshold state of charge. A tenth example of the method optionally includes the first through ninth examples, and further comprises in response to the level of water being below a threshold when a braking event is not occurring, collecting water for water injection from an alternate water collection system of the hybrid electric vehicle.

As another embodiment, a method comprises during a first condition, increasing a ratio of friction braking to regenerative braking in response to a state of charge (SOC) of a battery being above a threshold SOC during a vehicle braking event; and during a second condition, decreasing the ratio of friction braking to regenerative braking and running an AC compressor of an electric AC system coupled to the battery in response to the SOC of the battery being above the threshold SOC during the vehicle braking event, collecting condensate from the AC system, and storing the collected condensate at a water reservoir of a water injection system. In a first example of the method, the method further includes wherein the first condition includes a water level of the water reservoir above a threshold water level and the second condition includes the water level of the water reservoir below the threshold level. A second example of the method optionally includes the first example and further comprises, during the first condition, operating the AC compressor based on an operator request only and not based on the water level. A third example of the method optionally includes one or more of the first and second examples, and further comprises, during the second condition, increasing bleeding of warmer air with cooled air from the AC system prior to flowing the cooled air to an operator cabin of the hybrid vehicle system in response to AC not being requested by an operator of the hybrid vehicle system, where an amount of warmer air bled into the cooled air increases as a load on the AC compressor from regenerative braking increases. A fourth example of the method optionally includes the first through third examples, and further comprises, after conclusion of the vehicle braking event during the second condition, decreasing an output of cooled air from the AC system below a demanded level, where the amount of decreasing the output of cooled air is based on an output of cooled air from the AC system during the second condition. A fifth example of the method optionally includes the first through fourth examples, and further comprises, during the second condition, decreasing the ratio of friction braking to regenerative braking to generate energy, storing a first portion of the generated energy at the battery, and using a remaining, second portion of the generated energy to run the AC compressor in response to the SOC of the battery being below the threshold SOC during the vehicle braking event, where the first portion and second portion are based on each of an amount the SOC of the battery is below the threshold SOC, an amount the water level is below the threshold level, and demanded water injection amount from the water injection system.

As yet another embodiment, a system includes a battery; an electric air conditioning (AC) system including an AC compressor coupled to the battery; a regenerative brake system coupled to the battery and the AC compressor; a water injection system including a water reservoir fluidly coupled to the AC system and one or more water injectors coupled to an engine of the hybrid vehicle system; and a controller including non-transitory memory with computer-readable instructions for: running the AC compressor using electrical energy recovered from the regenerative brake system during a braking event and adjusting a ratio of friction braking to regenerative braking based on a level of water in the water reservoir. In a first example of the system, the system further includes wherein the water reservoir is fluidly coupled to a condenser of the electric AC system, the AC compressor is coupled to each of the battery and a conversion unit, and the one or more water injectors are coupled to each of the water reservoir and an intake system of the engine. A second example of the system optionally includes the first example and further includes wherein the computer-readable instructions further include instructions for: injecting water from the water reservoir via the one or more water injectors in response to a water injection request and adjusting an amount of energy provided to the AC compressor from the regenerative brake system during the braking event based on a water injection amount requested by the water injection request.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle system, comprising:
adjusting an air conditioning (AC) compressor load of an electric AC system and a ratio of friction to regenerative brake effort during braking by running an AC compressor of the electric AC system to increase the AC compressor load, and decreasing the ratio of friction to regenerative brake effort, which includes brake power, in response to a level of water in a water reservoir coupled to a water injection system being below a threshold water level.

2. The method of claim 1, further comprising:
in response to a state of charge of a battery of the hybrid vehicle system being greater than a threshold state of charge, transferring all energy from regenerative braking to the AC compressor and not storing energy from regenerative braking at the battery; and
wherein an amount of decreasing the ratio of friction to regenerative brake effort increases as the level of water decreases further below the threshold water level.

3. The method of claim 1, further comprising, in response to a state of charge of a battery of the hybrid vehicle system being less than a threshold state of charge, decreasing the ratio of friction to regenerative brake effort to generate energy and storing a first portion of the generated energy at the battery and using a remaining, second portion of the generated energy to run the AC compressor.

4. The method of claim 3, wherein the first portion and the second portion are based on an amount of water being injected via the water injection system and the state of charge of the battery.

5. The method of claim 1, further comprising collecting water produced by the electric AC system during running the AC compressor and storing the collected water at the water reservoir.

6. The method of claim 5, further comprising injecting the water stored at the water reservoir into one or more of an intake manifold, an intake runner of an engine cylinder, and an engine cylinder via one or more water injectors of the water injection system based on engine operating conditions.

7. The method of claim 1, further comprising, in response to AC not being requested by a user at a cabin of the hybrid vehicle system during the braking and running the AC compressor in response to the level of water being below the threshold water level, increasing blending of warmer air into the cabin.

8. The method of claim 1, wherein adjusting the AC compressor load and the ratio of friction to regenerative brake effort during braking includes running the AC compressor of the electric AC system based on an operator request only and not based on the level of water and decreasing the ratio of friction to regenerative brake effort in response to the level of water being above the threshold water level and a state of charge of a battery of the hybrid vehicle system being less than a threshold state of charge.

9. The method of claim 1, wherein adjusting the AC compressor load and the ratio of friction to regenerative brake effort during braking includes running the AC compressor of the electric AC system based on an operator request only and not based on the level of water and increasing the ratio of friction to regenerative brake effort in response to the level of water being above the threshold water level and a state of charge of a battery of the hybrid vehicle system being greater than a threshold state of charge.

10. The method of claim 1, further comprising, in response to the level of water being below the threshold water level when a braking event is not occurring, collecting water for water injection from an alternate water collection system of the hybrid vehicle system.

11. A method for a hybrid vehicle system, comprising:
during a first condition, increasing a ratio of friction braking to regenerative braking in response to a state of charge (SOC) of a battery being above a threshold SOC during a vehicle braking event; and
during a second condition, decreasing the ratio of friction braking to regenerative braking and running an AC compressor of an electric AC system coupled to the battery in response to the SOC of the battery being above the threshold SOC during the vehicle braking event, collecting condensate from the AC system, and storing the collected condensate at a water reservoir of a water injection system,
wherein the first condition includes a water level of the water reservoir above a threshold water level and the second condition includes the water level of the water reservoir below the threshold level.

12. The method of claim 11, further comprising, during the first condition, operating the AC compressor based on an operator request only and not based on the water level.

13. The method of claim 11, further comprising, during the second condition, increasing bleeding of warmer air with cooled air from the electric AC system prior to flowing the cooled air to an operator cabin of the hybrid vehicle system in response to AC not being requested by an operator of the hybrid vehicle system, where an amount of warmer air bled into the cooled air increases as a load on the AC compressor from regenerative braking increases.

14. The method of claim 11, further comprising, after conclusion of the vehicle braking event during the second condition, decreasing an output of cooled air from the electric AC system below a demanded level, where an amount of decreasing the output of cooled air is based on the output of cooled air from the AC system during the second condition.

15. The method of claim 11, further comprising, during the second condition, decreasing the ratio of friction braking to regenerative braking to generate energy, storing a first portion of the generated energy at the battery, and using a remaining, second portion of the generated energy to run the AC compressor in response to the SOC of the battery being below the threshold SOC during the vehicle braking event, where the first portion and the second portion are based on each of an amount the SOC of the battery is below the threshold SOC, an amount the water level is below the threshold water level, and a demanded water injection amount from the water injection system.

16. A hybrid vehicle system, comprising:
a battery;
an electric air conditioning (AC) system including an AC compressor coupled to the battery;
a regenerative brake system coupled to the battery and the AC compressor;
a water injection system including a water reservoir fluidly coupled to the electric AC system and one or more water injectors coupled to an engine of the hybrid vehicle system; and
a controller including non-transitory memory with computer-readable instructions for:
running the AC compressor using electrical energy recovered from the regenerative brake system during a braking event and adjusting a ratio of friction braking to regenerative braking based on a level of water in the water reservoir, the ratio of friction braking to regenerative braking decreasing in response to the level of water in the water reservoir being less than a threshold water level.

17. The hybrid vehicle system of claim 16, wherein the water reservoir is fluidly coupled to a condenser of the electric AC system, the AC compressor is coupled to each of the battery and an energy conversion device, and the one or more water injectors are coupled to each of the water reservoir and an intake system of the engine.

18. The hybrid vehicle system of claim 17, wherein the computer-readable instructions further include instructions for: injecting water from the water reservoir via the one or more water injectors in response to a water injection request and adjusting an amount of energy provided to the AC compressor from the regenerative brake system during the braking event based on a water injection amount requested by the water injection request.

* * * * *